(12) United States Patent
Kim

(10) Patent No.: US 6,944,623 B2
(45) Date of Patent: Sep. 13, 2005

(54) METHOD FOR DATA SYNCHRONIZATION IN WEB-BASED COMMUNICATIONS MANAGEMENT SYSTEM

(75) Inventor: Young-Eun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 907 days.

(21) Appl. No.: 09/932,949

(22) Filed: Aug. 21, 2001

(65) Prior Publication Data

US 2002/0059465 A1 May 16, 2002

(30) Foreign Application Priority Data

Aug. 21, 2000 (KR) ........................................ 2000-48231

(51) Int. Cl.[7] .............................................. G06F 17/30
(52) U.S. Cl. ......................... 707/102; 707/10; 707/101; 707/103 R; 709/203; 715/513
(58) Field of Search ................................ 709/248, 203, 709/206, 217, 218, 219, 227; 707/8, 10, 201, 100, 101, 102, 103 R, 104.1; 715/513, 530

(56) References Cited

U.S. PATENT DOCUMENTS

| | | | | |
|---|---|---|---|---|
| 6,092,077 A | * | 7/2000 | Ahmadi ...................... | 707/102 |
| 6,314,408 B1 | * | 11/2001 | Salas et al. .................... | 705/54 |
| 6,393,462 B1 | * | 5/2002 | Mullen-Schultz ........... | 709/206 |
| 6,466,949 B2 | * | 10/2002 | Yang et al. .................. | 707/201 |
| 6,714,926 B1 | * | 3/2004 | Benson ........................ | 707/102 |

OTHER PUBLICATIONS

Bright, Jonathan D. et al., "Checking the Integrity of Trees", 1995 IEEE, Twenty–Fifth International☐☐Symposium on Fault–Tolerant Computing. FTCS–25. Digest of Papers., Jun. 27–30 1995, pp. 402–411.*

Kafeza, Eleanna et al., "Transaction Synchronization in Structures for Point Data", GIS, 1997 ACM, pp. 44–49.*

Kanth, K. V. Ravi et al., "Improved Concurrency Control Techniques for Multi–dimensional Index Structures", http://ipdps.eece.unm.edu/1998/papers/295.pdf.*

* cited by examiner

*Primary Examiner*—Shahid Al Alam
(74) *Attorney, Agent, or Firm*—Fleshner & Kim, LLP

(57) ABSTRACT

Disclosed is a method for data synchronization in a web-based transmission device management system, in which managing data requiring synchronization between a web server and a client is constructed as a tree data structure, and a change flag for judging a data change is easily set. The web server increases a second event number by a certain degree whenever an event datagram is transmitted to the client, and the client judges whether or not the event datagram is lost by comparing the second event number and a first event number stored by the client whenever an event datagram is transmitted from the web server. If the event datagram is not lost, the client increases the first event number by a certain degree and performs data synchronization using the received event datagram. However, if the event datagram is lost, the client transmits every checksum of the leaf nodes in its tree data structure in one request datagram to the web server, and performs data synchronization by receiving changed data from the web server. Therefore, a loss of data is recognized promptly and precisely, and change of data on the web server also can be recognized promptly.

24 Claims, 10 Drawing Sheets

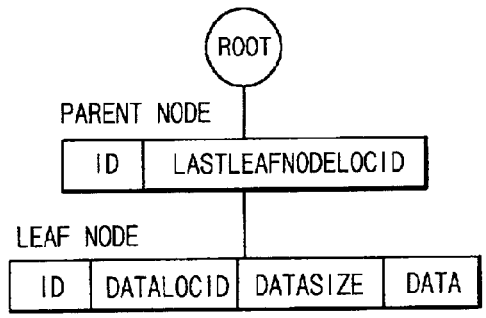

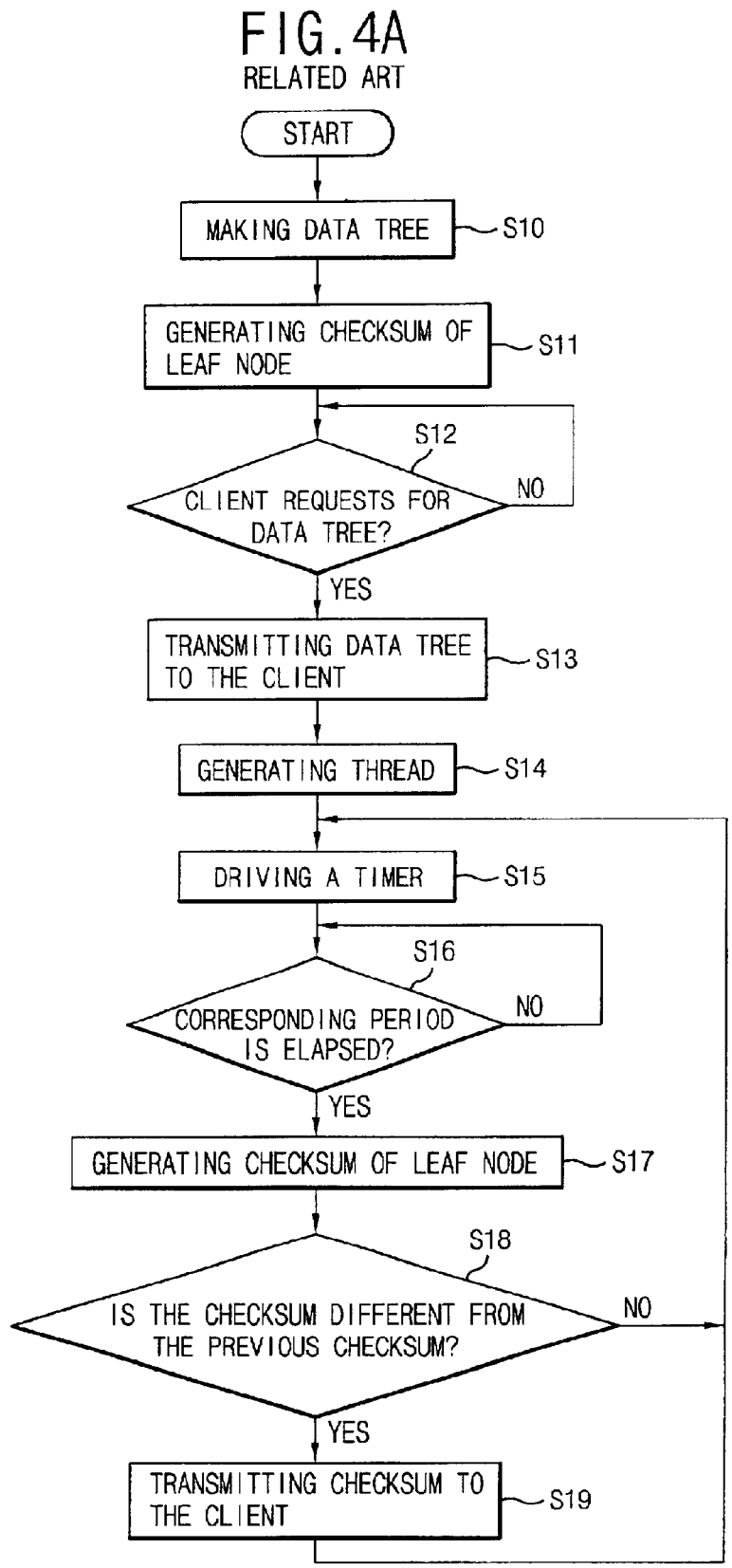

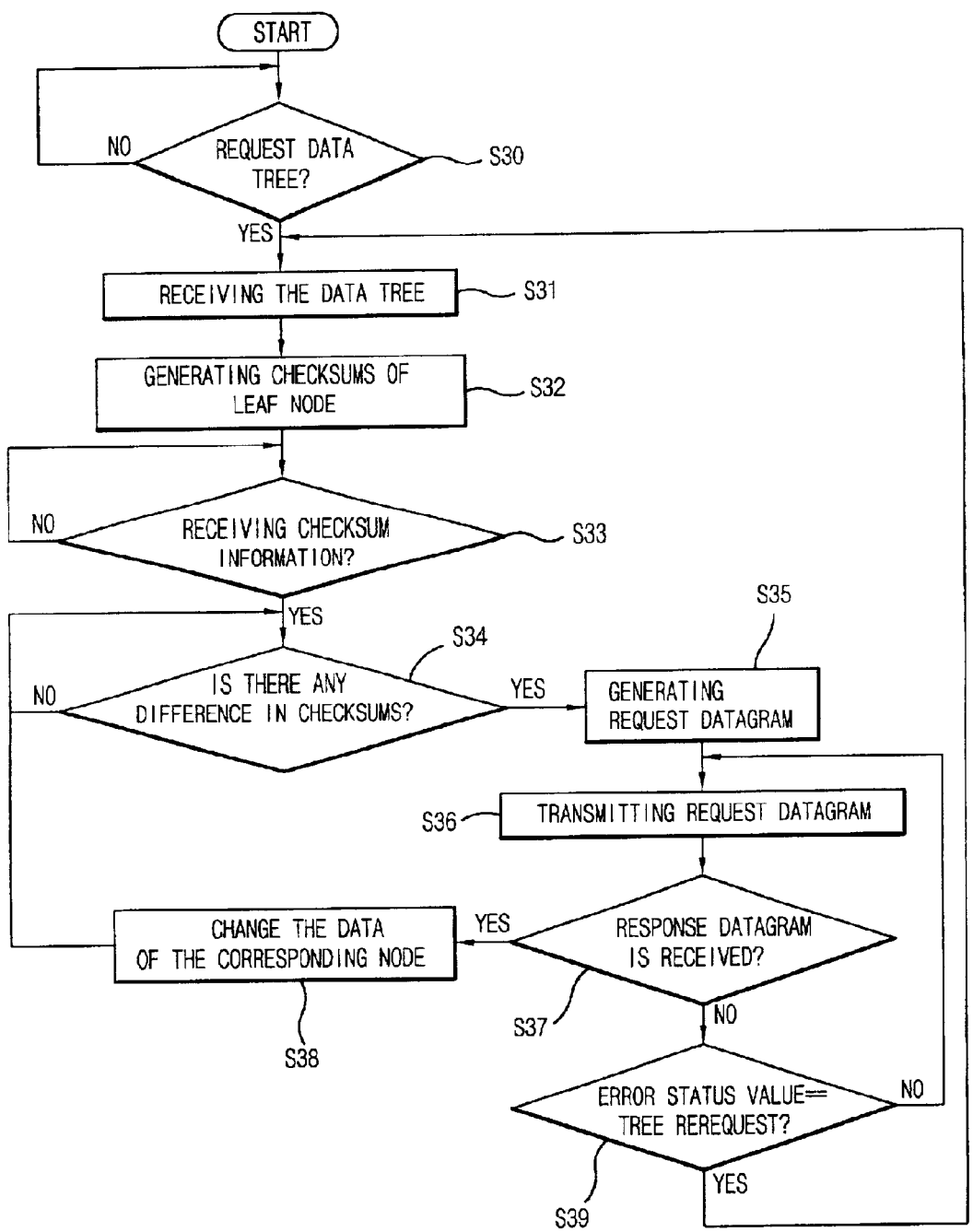

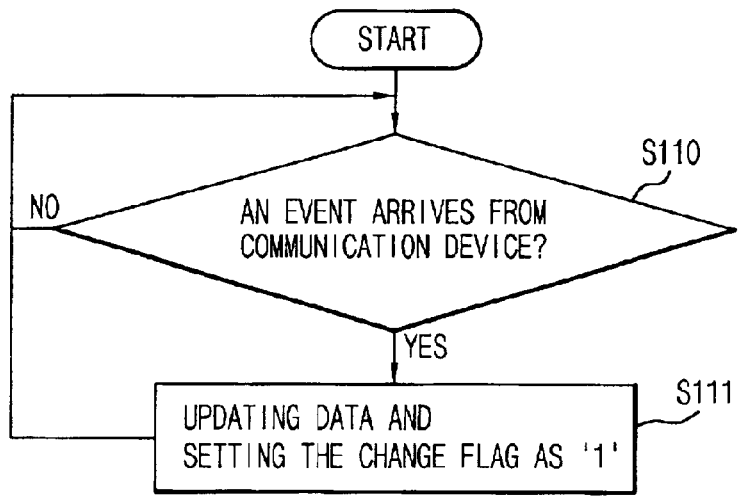
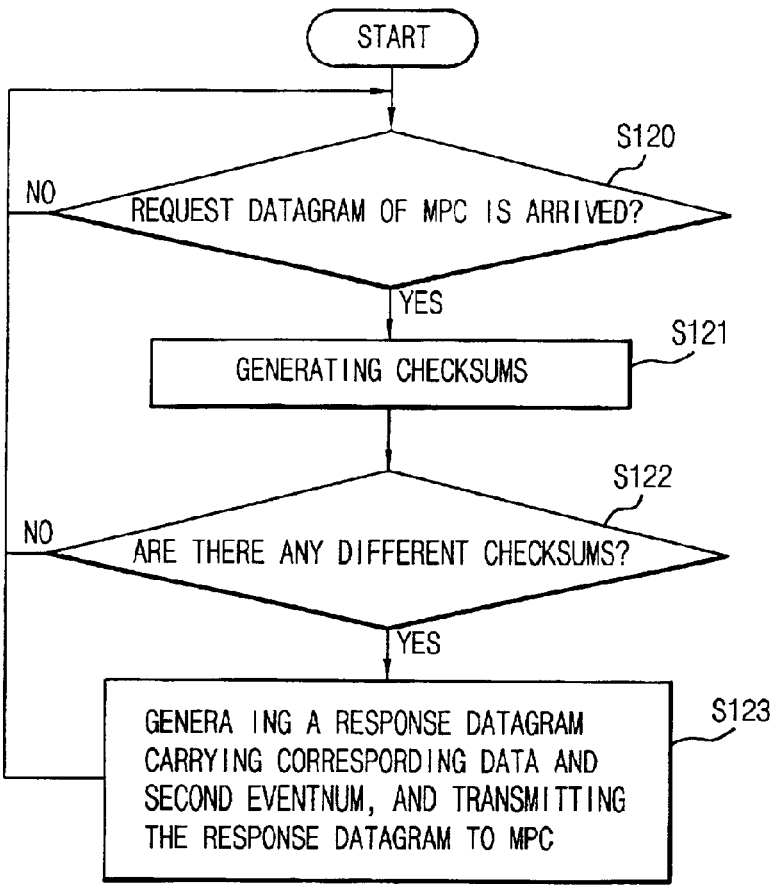

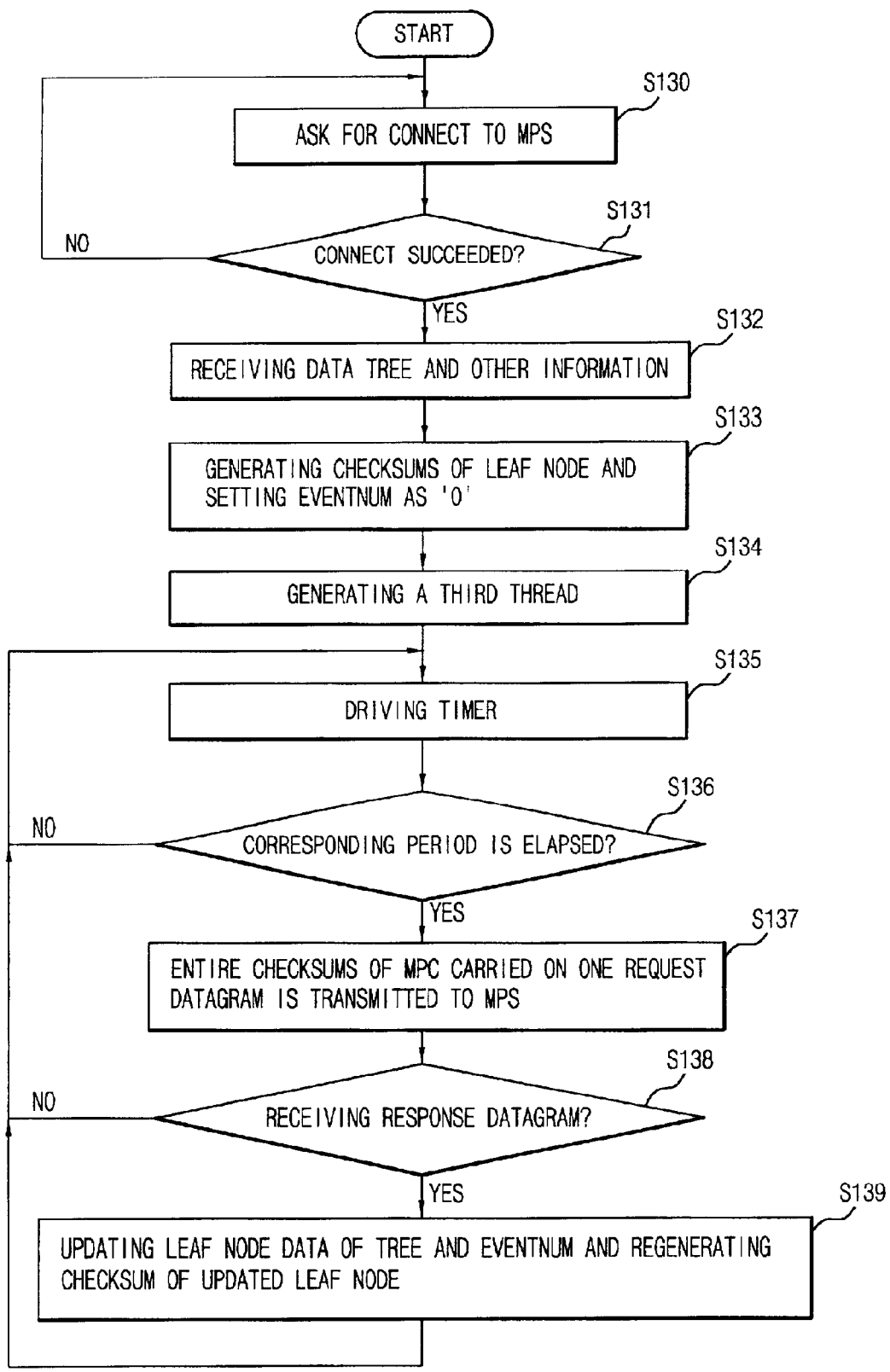

METHOD FOR DATA SYNCHRONIZATION IN WEB-BASED COMMUNICATIONS MANAGEMENT SYSTEM

BACKGROUND OF THE INVENTION

1. Field of the Invention

The present invention relates to a web-based communication management system and, more particularly, to a method for reducing the amount of data transmitted between a server and a client in a web-based management system of a client-server type.

2. Background of the Related Art

Generally, a web-based communication system is capable of communicating multimedia information, including a voice signal, promptly and precisely among widely separated users. The web-based communication system supports numerous subscribers and communicates information precisely, with little error in the conveyed information. Even if there is an error, an operator of the system should be able to detect the error.

A client-server model applied as a management system for the communication system allows an operator to manage the communication system at the server site or any other site having a client device in communication with the server. Although operating information and management data for the communication system are stored by the web server, the operator of the management system may access the stored information and manage the communication system through a web-based client of the server.

To manage the communication system using the client-server model, data shared by the client and the web server should be current and synchronized. Data synchronization between the client and the web server should be performed to synchronize the shared data.

FIG. 1 is a block diagram showing a structure of a related art web-based communication management system. A communication device 10 communicates data between respective individuals and provides information used to manage and control the communication device. An exclusive network 20 provides a communication path for the communicated data and a web server 30 connects to the exclusive network 20 that manages and controls the transmission devices 10. A web-based public network 40 connects to the web server 30 and a client 50 so that the operator may manage the communication devices 10 through a client terminal 50, which is remotely located with respect to the server 30.

Management Process Server (MPS) 35, operating within the server 30, provides an interface for the server 30 to manage and control the communication devices 10. A Management Process Client (MPC) 55, operating within the client 50, interfaces the operator to the server 30 through the client terminal 50.

Data synchronization can be achieved by a polling processing method and an event processing method using the above-described system. Using the polling processing method, the MPC 55 requests synchronization data from the MPS 35 and updates its respective client's copy of the management data using the downloaded data. However, this method generates a lot of traffic due to frequent or periodic synchronization requests made by the MPC 55. These requests may occur even when there is no data to be updated.

Using the event processing method, the MPS 35 transmits the data that has been revised or its entire copy of the management data to the MPC 55 when a specific event occurs. If the MPC 55 does not receive the communication data, a management re-synchronization should be made. However, no confirmation mechanism is provided by the event processing method to ensure the management data communicated by the MPS is received and stored by the MPC 55.

To solve the above problems, the web-based communication management system adapts the synchronization methods of the polling processing method and the event processing method to an improved management system.

FIG. 2 is a block diagram showing a structure of information used for synchronization in the related art data synchronization method. The synchronization data of the tree structure illustrated includes a root, a parent node, and a leaf node. The parent node may be a multiple step structure, that is, a sub-parent node may be constructed by the characteristics of the management data. The parent node includes an Identifier (ID) of the parent node itself and an ID of the last leaf node that is managed by the parent node. The leaf node includes an ID of the leaf node and its parent node, an ID indicating the location of the leaf node (DataLocID), a DataSize identifying the size of the stored data, and the stored management data.

A data synchronization method using the related art web-based communication management system will be described below. Web server 30 forms the management data to be communicated for synchronization with the client 50 into the tree data structure of FIG. 2. The client 50 downloads this data structure when initially connected to the web server 30.

The web server 30 periodically generates a checksum value for each leaf node in the tree structure, during system operation, and transmits the generated checksum information to the client 50, if the checksum value is different from the checksum value previously generated. The client 50 compares the received checksum information to the checksum information for the corresponding leaf node in the data tree structure stored by the client terminal 50. If the checksums have different values, the client 50 transmits a datagram to the web server identifying the location of the leaf node having the obsolete checksum value. Web server 30 searches its storage file for the current data corresponding to the leaf node location identified by the datagram and transmits this current data to the client 50. Then, client 50 updates its record of the leaf node data using the current data communicated by web server 30 and data synchronization between the web server 30 and the client 50 is achieved for the leaf node. This process is described in more detail below.

FIG. 4A is a flow chart showing a data synchronization method of web server for the related art web-based communication management system. FIG. 4B is a flow chart showing a method employed when the web server transmits data of the corresponding data tree to the client, after receiving a request to transmit the identified data tree. FIG.

5 is a flow chart showing a data synchronization method of the client in the related art web-based communication management system.

The MPS 35 operating in the web server 30 groups data needed to manage the communication device 10 according to its relevancy and forms the grouped data as a tree data structure (S10). After that, MPS 35 generates a checksum for each leaf node in the tree structure (S11). Additionally MPS 35 monitors the communications received from the clients 50 to determine whether a request for the tree data structure has been made by the MPC 55 (S12). When the MPC 55 of the client 50 initially connects to the MPS 35, it requests information from the tree data structure for synchronization (S30). The MPS 35 transmits the requested information to the MPC 55 in accordance with the request (S13). To transmit this information, the MPS 35 generates a Thread (S14). The MPC 55 generates a checksum of the leaf node downloaded from the MPS 35 (S31 and S32).

MPS 35 periodically generates a checksum of each leaf node in the tree data structure stored by server 30 using a timer (S15, S16 and S17). As a checksum is generated for a leaf node, the checksum is compared with the previously generated checksum for the leaf node (S18). If the compared checksums for the leaf node do not match, then the data stored by the leaf node has been revised since the previous checksum period. To inform the MPC 55 of the revision, the MPS 35 generates a checksum datagram as shown in FIG. 3A and transmits the datagram to the MPC 55(S19). The checksum datagram includes a DatagramSize identifying the total size of the datagram, a DatagramType identifying the type of datagram, and checksums of the leaf node having a different earlier checksum.

Upon receiving the checksum datagram from MPS 35, MPC 55 compares the checksums included the checksum datagram to the checksums of the leaf node stored by the client's tree data structure (S33 and S34). If any of the compared checksums differ, MPC 55 generates a request datagram as shown in FIG. 3B and transmits it to the MPS 35 (S35 and S36). The request datagram includes a DatagramSize, a DatagramType, and IDs representing the locations of the leaf nodes having the outdated checksums (DataLocID).

When the request datagram is received from the MPC 55, the Thread generated by MPS 35 interprets it (S21 and S22). The thread searches each leaf node stored by the server 30 having an outdated checksum, as identified by in the request datagram, for the changed data (S23). After the thread finds the data for all of the leaf nodes identified by the request datagram, the current data for each leaf node is conveyed to the requesting MPC 55 in the response datagram, illustrated in FIG. 3C (S24 and S26). The response datagram includes a DatagramSize, a DatagramType, a DataSize, and data.

However, if MPS 35 cannot find the leaf node identified by the request datagram in the tree structure stored by the MPS 35, then MPS 35 generates an error datagram as shown in FIG. 3D and transmits it to the requesting MPC 55. The error datagram includes a DatagramSize, a DatagramType, and an ErrorStatus.

When the MPC 55 receives the response datagram from the MPS 35 (S37), the MPC 55 revises the data of the corresponding leaf node in its stored tree data structure using the data provided in the response datagram (S38). When the MPC 55 receives the error datagram, it determines whether the re-request for tree structure switch is set. If the re-request for tree structure switch is set, the MPC 55 sends another request for the tree structure to the MPS 35 and returns to the S31 process. However, if the re-request for the tree structure switch is not set, the MPC 55 returns to the S36 process and submits a datagram request for the data of the corresponding leaf node to MPS 35 (S36).

Using related art synchronization method with the web-based communication management system, if the datagram transmitted from the web server to the client is lost, the client is not able to recognize the lost data precisely. Therefore, the period during which data stored by the web server and data stored by the client differ is long, making the management of the communication device slow and less effective.

Also, the web server determines whether the data is changed by comparing the current checksums, of respective leaf nodes of the tree structure, to the checksums of an earlier period. This process is complex and time consuming.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Therefore, an object of the present invention is to provide a method for data synchronization in a web-based communication management system by which a loss of data communicated between a server and a client can be recognized promptly and precisely. Whereby, the reliability and stability for of the management managing system can be increased.

Another object of the present invention is to provide a method for data synchronization in a web-based communication management system by which data changes occurring in the web server are promptly recognized, using a change flag to indicate whether the management data related to a communication device has changed.

Still another object of the present invention is to provide a method for data synchronization in a web-based transmission device management system by which the size of the entire data tree structure communicated between the web server and the client is reduced. This is accomplished by using leaf nodes to construct the tree data structure for data synchronization between the web server and the client.

To achieve these and other advantages and in accordance with the purpose of the present invention, as embodied and broadly described herein, there is provided a method for data synchronization in a web-based transmission device management system comprising the steps of: generating data of tree structure which needs to synchronize between a web server and a client in a web-based transmission device management system and initializing a change flag representing whether data is changed or not; setting the change flag of changed data as a certain value for notifying the change of the data if the data is changed; transmitting the tree data structure except the change flag to the client when an initial connect is requested by the client; comparing a newly generated checksums to the checksums included in a request datagram after generating a new checksums for all data in the tree data structure included in the web server, if the request datagram is transmitted from the client; transmitting the pertinent data and an event number for judging the loss of event that are carried on a response datagram to the client, if the newly generated checksum and the checksum included in the request datagram are different from each other; inspecting values of the change flag periodically; and transmitting corresponding data in which the value of the change flag is set as the certain value, carried on an event datagram to the client.

To achieve the objects of the present invention, there is provided a method for data synchronization of a client in a web-based transmission device management system comprising the steps of: receiving the data requiring synchronization between a web server and the client as a tree data structure by connecting to the web server in the web-based transmission device management system; generating checksums of the leaf node included in the received tree data structure and initializing a first event number for judging a data loss; comparing a second event number included in an event datagram to the first event number, when an event datagram is transmitted from the web server; increasing the first event number to a certain degree, updating the leaf node information of the tree data structure, and regenerating the checksums of the updated leaf node, if the first and the second event number are same as each other; transmitting entire checksums for leaf node in the tree data structure of the client carried on one request datagram, if the first event number and the second event number are not same as each other; and updating information for leaf node in the tree data structure of the client using a response datagram, updating the first event number, and regenerating checksums of the updated leaf node, when the response datagram is transmitted from the web server.

The object of the present invention can be achieved in whole or in part by a method for data synchronization, including for each of a number of communication devices, generating a server leaf node within a server tree data structure including management data of the respective communication device and a change flag; communicating the server tree data structure to a client of a client server system as a client tree data structure, wherein each server leaf node has a corresponding client leaf node within the client tree structure, when the client initially communicates with the server; setting the change flag of the corresponding server leaf node when the management data of one of the number of communication devices is revised; and resetting the change flag of the corresponding server leaf node when the revised management data is communicated by the sever to the client.

Additional advantages, objects, and features of the invention will be set forth impart in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The preferred embodiments of the invention will be described in detail with reference to the following drawings in which like reference numerals refer to like elements wherein:

FIG. 2 illustrates a related art data structure used for synchronization;

FIG. 3A illustrates a structure of a related art checksum datagram;

FIG. 3B illustrates a structure of a related art request datagram;

FIG. 3C illustrates a structure of a related art response datagram;

FIG. 3D illustrates a structure of a related art error datagram;

FIG. 4A illustrates a data synchronization method of a related art web server;

FIG. 5 illustrates a related art data synchronization method of the client;

FIG. 8B illustrates an event process of the web server when the event arrives from the communications device, according to a preferred embodiment of the present invention;

FIG. 8C illustrates a preferred embodiment for method for transmitting a data tree to the client, when the web server receives a request for the data tree from the client;

FIG. 9A illustrates a data synchronization method of the client according to a preferred embodiment of the present invention.

DETAILED DESCRIPTION OF PREFERRED EMBODIMENTS

Reference will now be made in detail to the preferred embodiments of the present invention, examples of which are illustrated in the accompanying drawings.

Figure 1:
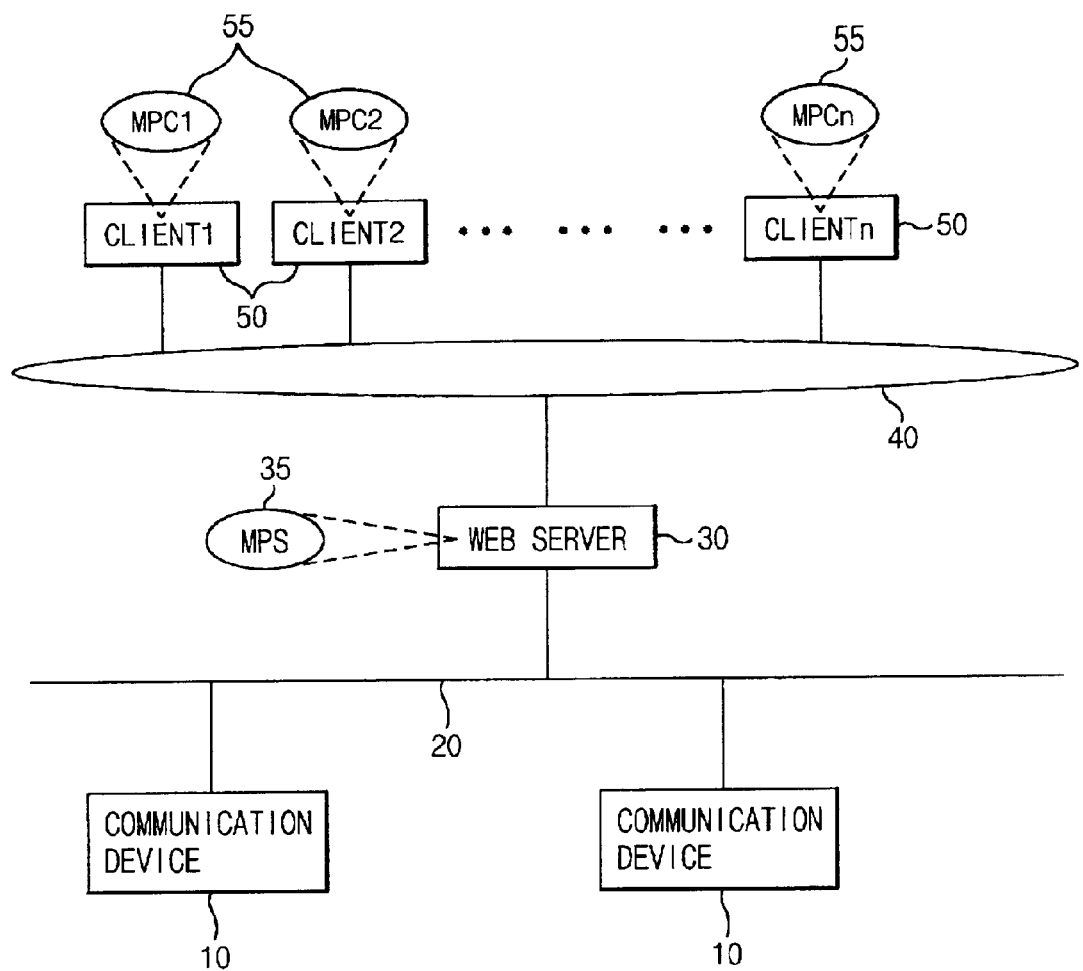
FIG. 1 illustrates a structure of a general web-based communication management system.
Figure 4B:
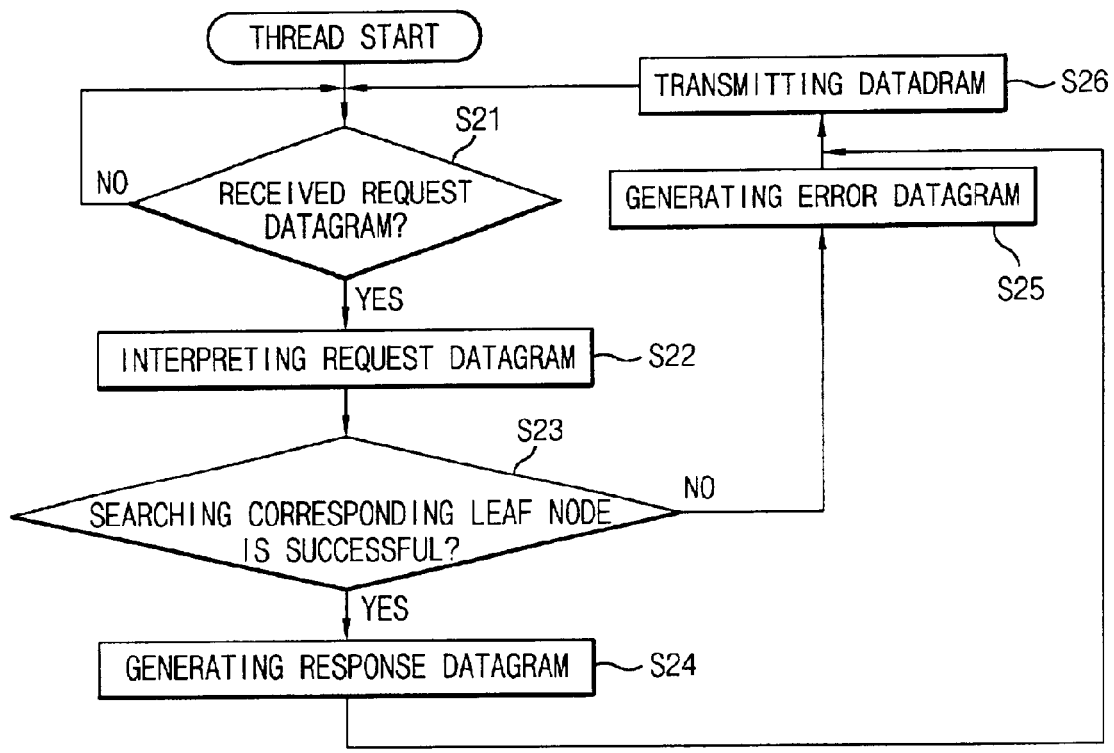
FIG. 4B illustrates a method for transmitting data of a corresponding data tree to the client when the web server receives a request for the data tree.
Figure 6:
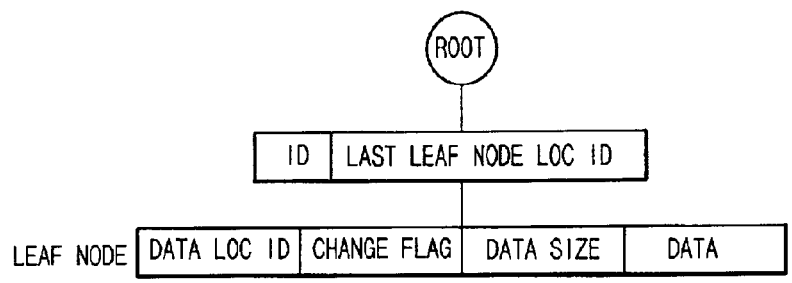
FIG. 6 illustrates a synchronization data structure according to a preferred embodiment of the present invention.

FIG. 6 illustrates a data synchronization structure that includes a root, a parent node, and a leaf node. The leaf node includes an identifier of a position of the leaf node (DataLocID), a ChangeFlag indicating a data revision within the corresponding leaf node; a DataSize identifying a size of the management data, and the management data. The ID referencing the parent node, as used by the related art, is removed and the leaf node has only essential information. Also, the leaf node includes a change flag for identifying changed data easily. Therefore, when a search is conducted to find changed data, the change flag is used and the search time is shortened. The parent node includes information about the child node managed by the parent node.

A web server 30 in the web-based communication management system stores synchronization data regarding the communication device 10 as a tree structure. The client 50 downloads the tree data structure when it initially connects to the web server 30. Additionally, the client initializes a first event number (first EventNum) for referencing an event loss. When an event loss is detected, the MPS 35 generates the checksums of the affected leaf nodes and transmits these checksums to the web server 30. Web server 30 has a second event number (second EventNum) for similarly referencing an event loss.

When a data revision event is communicated to the web server 30 by the communication device 10, web server 30 revises the data stored in the corresponding leaf nodes and sets the change flag indicator of the affected leaf node to a certain value (for example, a value of 1). The web server 30 inspects the change flag periodically. If the flag is set, server 30 transmits the revised data and the second EventNum to the client 50. Thereafter, the server 30 resets the changed flag to a certain other value (e.g., a value of 0). When the client 50 receives the revised data and the second EventNum transmitted from web server 30, the client 50 determines whether the event is lost by comparing the first EventNum to the second EventNum. If the event is not lost, the client 50 updates its tree structure to reflect the revised data communicated by the server 30. Additionally, the client 50 regenerates a checksum of each of the changed leaf nodes and increases the first EventNum value by a designated amount. However, if the event is lost, the client 50 does not change its stored data. Instead, it transmits the checksum of every leaf node in the tree structure to the web server 30 and requests synchronization.

Also, the client 50 transmits checksums of all the leaf nodes in its stored tree data structure to the web server 30 periodically to reduce the synchronization time of the management data between the two devices. In response, the server 30 communicates the data that is not synchronized with the client 50 so that the client can update its stored data, which it does.

The method for data synchronization between the web server and the client in the web-based communication management system according to a preferred embodiment of the present invention is described in more detail below.

Figure 8A:
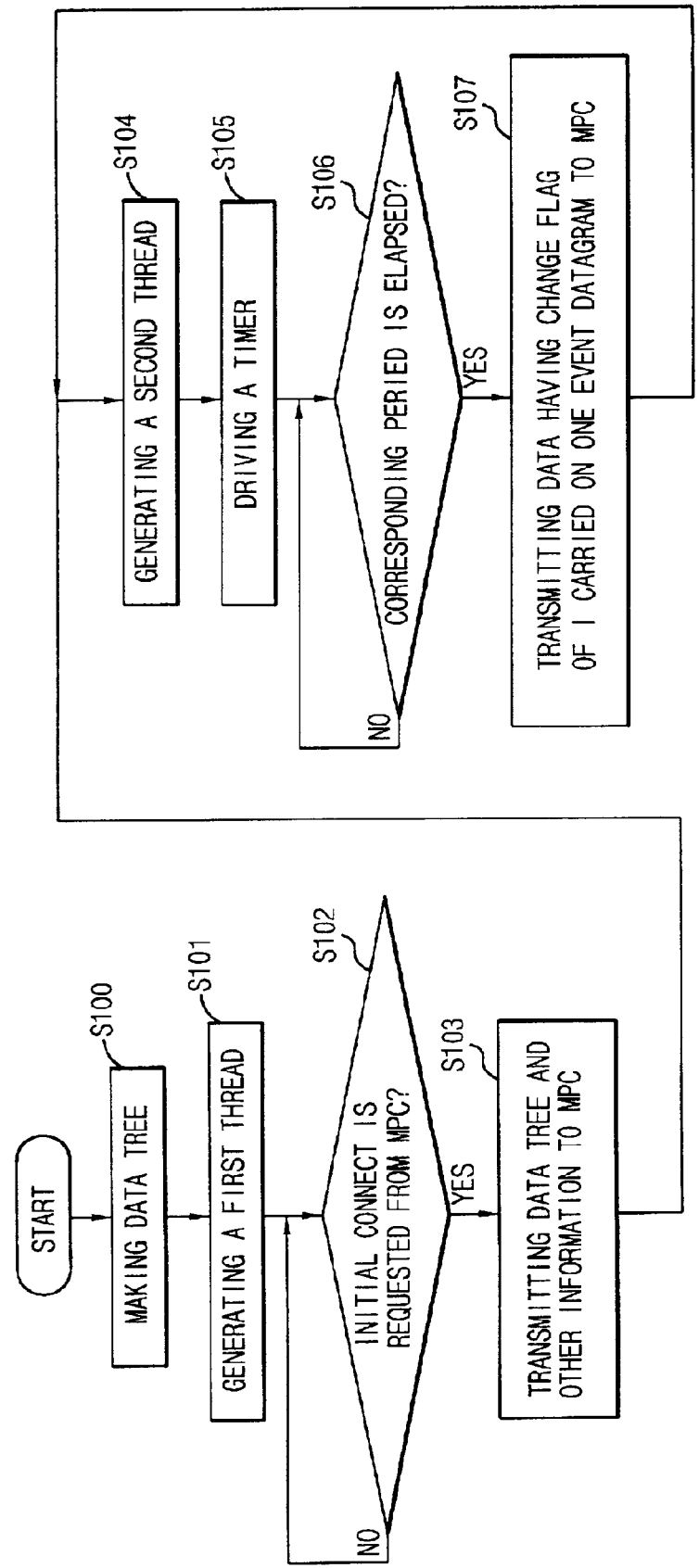
FIG. 8A illustrates a data synchronization method of a web server in a web-based communication management system according to a preferred embodiment of the present invention.

FIG. 8A is a flow chart showing the data synchronization method of the web server. FIG. 8B is a flow chart showing event processing of the web server when an event arrives from the communication device. FIG. 8C is a flow chart showing a method used by the web server to transmit a tree data structure to the client, when the web server receives a request for the tree data structure from the client.

Figure 9B:
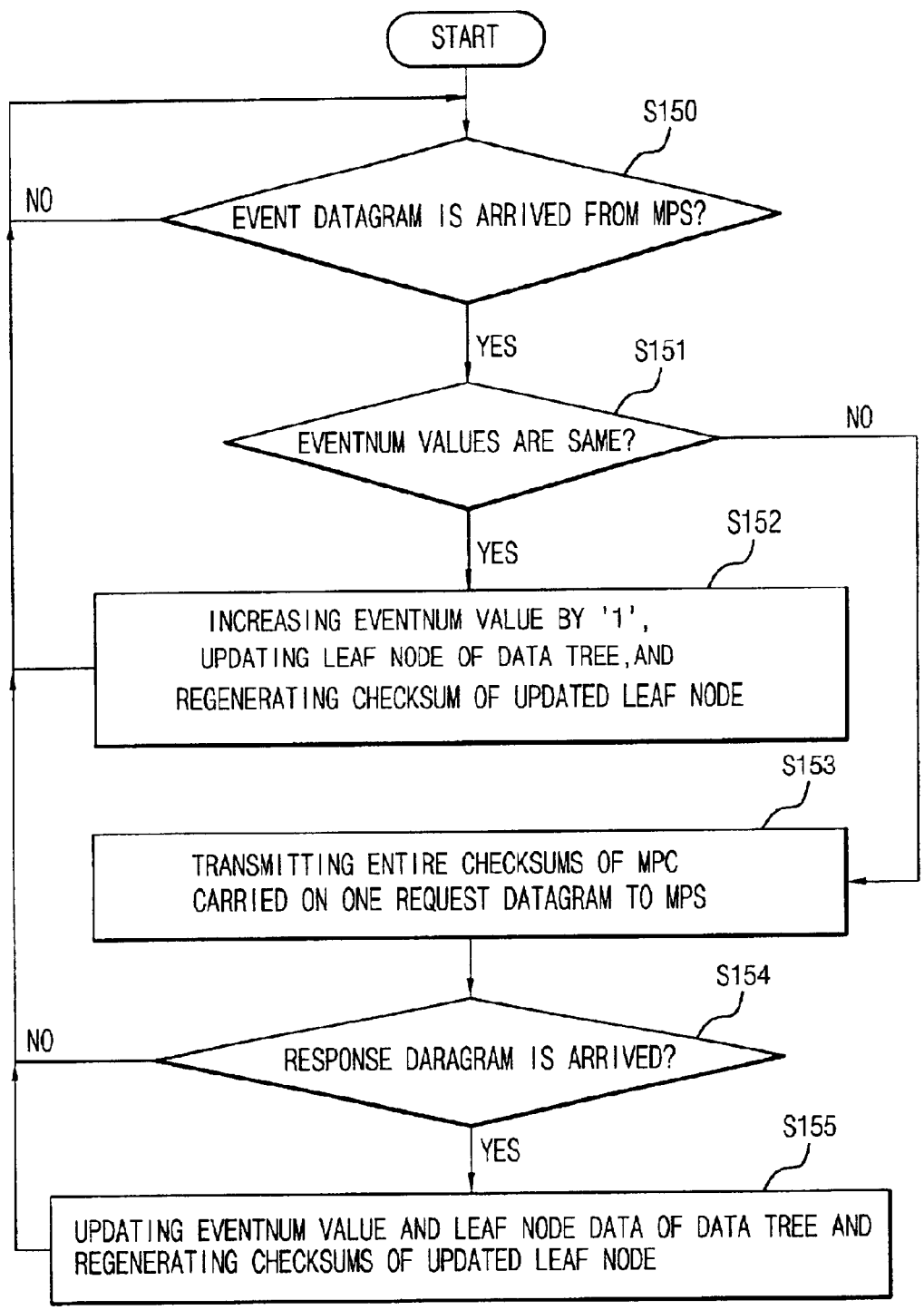
FIG. 9B illustrates an event process of the client when the event arrives from the web server, according to a preferred embodiment of the present invention.

FIG. 9A is a flow chart showing a data synchronization method of the client. FIG. 9B is a flow chart showing event processing of the client when an event arrives from the web.

The MPS 35, operating within the web server 30, groups the data needed to manage the communication device 10 in accordance with its relevancy and formats it as a tree data structure (S100). Then the MPS 35 generates a first thread for processing events communicated to it by the communication device 10 (S101). The first thread detects the event, when a management data revision event arrives (S110). Then, the first thread updates the data corresponding to the event stored in the MPS's 35 tree data structure and sets the change flag of the updated leaf node to indicate the change (S111).

Also, the MPS 35 determines whether there is an initial connect request from the MPC 55 of the client 50 (S102). If so, the MPS 35 transmits the tree data structure and other information, omitting the change flag in the tree structure, to the MPC 55 (S103). The MPC 55 receives the tree data structure and other information from the MPS 35 (S130–S132) and generates a checksum for every leaf node in the tree data structure. Then the MPC 55 sets the first EventNum to a certain value (for example, set as 0) (S133). After that, the MPC 55 generates a third thread for processing events transmitted from the MPS 35 (S134). Also, the MPS 35 generates a second thread for providing data in response to a tree data structure request from the MPC 55 (S104).

MPS 35 drives a timer and searches the data of the leaf node having a set change flag value, when the timer period expires. When the revised data of the search is found, the MPS 35 transmits the revised data to the MPC 55 (S107) in the event datagram. The event datagram is used to inform the MPC 55 that data synchronization has been lost and to synchronize the data stored by the client 50.

Figure 7A:
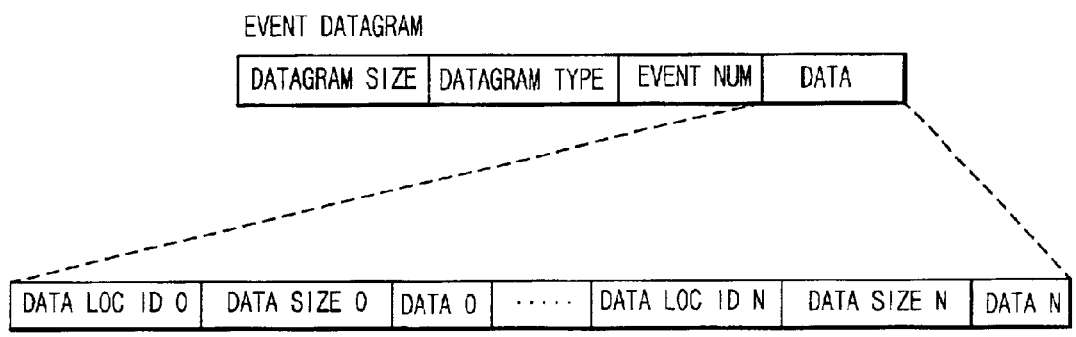
FIG. 7A illustrates event datagram structure according to a preferred embodiment of the present invention.

As shown in FIG. 7A, the event datagram includes a DatagramSize for identifying the entire size of the event datagram, a DatagramType for identifying a type of the event datagram, a second EventNum used to determine whether the event datagram is lost, and the revised management data. The second EventNum value is within a range of 0~65535 (16 bits), and is increased by 1 whenever one event datagram is transmitted. The value is wrapped to 0 when the upper limit of the range is reached.

The third thread generated by the MPC 55 monitors the arrival of the event datagram from the MPS 35. When an event datagram arrives (S150), the third thread compares the second EventNum included in the event datagram to the first EventNum maintained by the MPC 55 (S151).

If the first EventNum value and the second EventNum value are same, that is, an event datagram is not lost, the third thread increases the first EventNum value by a certain value (for example, by 1). The third thread then updates the leaf node data in the tree data structure of the MPC 55 and regenerates the checksums of the updated leaf nodes (S152).

Figure 7B:
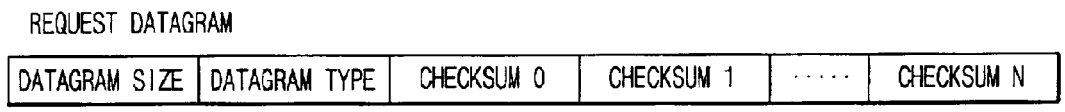
FIG. 7B illustrates a request datagram structure according to a preferred embodiment of the present invention.

If an event datagram is lost, the third thread does not revise the management data stored by the client 50 and corresponding to the event datagram, but instead transmits all of the checksums of the leaf nodes in the tree structure of the MPC 55 in one request datagram to the MPS 35 (S153). The MPC 55 recognizes the loss of the event datagram and, therefore, sends a request for the relevant revised data to the MPS 35 in an attempt to synchronize the management data. The request datagram includes a DatagramSize for identifying the entire size of the request datagram, a DatagramType for identifying a type of the request datagram, and the leaf node checksums, as shown in FIG. 7B.

As shown in FIG. 8C, the second thread of the MPS 35 observes the arrival of the request datagram from the MPC 55. When the request datagram arrives (S120), the second thread generates a checksum of the respective leaf nodes in the tree data structure of the MPS 35 and compares the generated checksums to the corresponding checksums included in the request datagram. If the compared checksums differ, the second thread transmits the leaf node data corresponding to the outdated checksums sent by the MPC 55 and also sends the second EventNum value in a response datagram to the MPC 55 (S123). The response datagram is a response to the request datagram sent by the MPC 55 and is constructed using the structure of the event datagram, as shown in FIG. 7A. However, the event datagram and the response datagram are distinguished by a value included in the DatagramType.

As shown in FIG. 9B, the third thread of the MPC 55 transmits the request datagram to the MPS 35 and waits for the arrival of the response datagram. When the response datagram is transmitted from the MPS 55 (S154), the third thread updates the leaf node data of the MPC's 55 tree data structure and the first EventNum using the information carried by the response datagram and then regenerates the checksums of the updated leaf nodes (S155).

Also, the MPC 55 drives a timer to reduce the data synchronization time. When the corresponding period is elapsed (S135 and S136), the MPC 55 transmits all of the checksums of the leaf nodes in the MPC's 55 tree data structure in the request datagram, shown in FIG. 7B, to the MPS 35 (S37). The second thread in the MPS 35 performs the processes of S120 through S123 and transmits the corresponding response datagrams to the MPC 55. The third thread of the MPC 55 observes whether the response datagram is received or not and, when the response datagram is received, the third thread performs the processes of S154 and S155.

As described above, the MPC 55 periodically transmits all of the checksums of the leaf nodes in the MPC's 55 tree data structure in the request datagram to the MPS 35, whereby the data synchronized between the MPC 55 and the MPS 35 are promptly synchronized.

As described above, the method for data synchronization in the web-based communication management system reduces the data synchronization time between the web server and the client by recognizing a loss of data promptly and precisely using certain data, which is able to detect the loss of data between the server and the client.

Also, the client periodically requests the revised management data in the server to update its leaf node data within its tree data structure, thereby reducing the data synchronization time between the server and the client.

In addition, when management data revisions require synchronization between the server and the client, the amount of data communicated between the server and the client is reduced by removing unnecessary information such as the relational ID (an ID of the leaf node referencing the parent node).

Also, data revisions made to the web server are promptly found using the change flag, which indicates a recent revision of the management data regarding the communication device that has not been conveyed to the client 50.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for data synchronization, comprising:

generating a tree data structure containing data requiring synchronization between a web server and a client and a number of change flags that each correspond to a separate leaf node of the tree data structure and each indicating whether a revision has been made to leaf node data stored in the leaf node;

setting each of the number of change flags to a true value, if the corresponding leaf node data is revised;

transmitting the tree data structure, except the number of change flags, to the client, when an initial connection is requested by the client;

generating a number of first checksums, each for the leaf node data stored in a separate one of the number of leaf nodes stored by the web server;

comparing each of the number of first checksums to a corresponding one of a number of second checksums contained in a request datagram communicated to the web server by the client;

for each of the number of leaf nodes whose first checksum did not match its corresponding second checksum during the comparison, transmitting the leaf node data associated with the first checksum and a first event number, associated with the leaf node data, to the client in a response datagram;

inspecting the value of each of the number of the change flags occasionally; and for each of the number of change flags set to the true value, transmitting the corresponding leaf node data in an event datagram to the client.

2. The method of claim 1, wherein each of the number of leaf nodes comprises:

a data location identifier (DataLocID) indicating a location of the leaf node;

the change flag (ChangeFlag) corresponding to the leaf node;

a DataSize identifying a size of the leaf node data; and the leaf node data regarding a communication device.

3. The method of claim 1, further comprising:

observing an arrival, from a communication device, of an event containing an information change pertaining to the communication device;

revising the leaf node data of the leaf node corresponding to the communication device to reflect the information change; and setting the change flag of the leaf node revised by the information change of the event to a true value.

4. The method of claim 1, wherein the request datagram includes a DatagramSize that identifies an entire size of the datagram, a DatagramType that identifies a type of the datagram, and the second number of checksums.

5. The method of claim 1, wherein the response datagram includes a DatagramSize that identifies an entire size of the datagram, a DatagramType that identifies a type of the datagram, an EventNum representing a loss of the event datagram, and the leaf node data.

6. The method of claim 1, wherein the event datagram includes a DatagramSize identifying an entire size of the datagram, a DatagramType that identifies a type of the datagram, an EventNum representing the loss of the event datagram, and the leaf node data.

7. The method of claim 1, wherein the change flag is set in the leaf node corresponding to a communication device in accordance with a report of an information change in the corresponding communication device, and is reset by the web server when the information change is transmitted to the client.

8. A method for data synchronization, comprising:

receiving a tree data structure requiring synchronization between a web server and a client by connecting to the web server;

generating a checksum of leaf node data in each of a number of leaf nodes in the received tree data structure and initializing a first event number for judging a loss of data;

comparing the first event number to a second event number included in an event datagram, when the event datagram is transmitted from the web server;

increasing the first event number by a certain degree, updating the leaf node data of a first set of leaf nodes of the number of leaf nodes in the tree data structure using data included in the event datagram, and regenerating the checksums of the updated first set of leaf nodes, if the first event number and the second event number are the same;

transmitting the checksums of every leaf node of the number of leaf nodes in the tree data structure in one request datagram to the web server, if the first event number and the second event number are different from each other; and updating the leaf node data of a second set of leaf nodes of the number of leaf nodes in the tree data structure using the data included in a response datagram, updating the first event number, and regenerating the checksums of the updated second set leaf nodes, when the response datagram is transmitted from the web server.

9. The method of claim 8 further comprising:

transmitting periodically the checksums of every leaf node of the number of leaf nodes in the tree data structure of the client in the request datagram to the web server;

updating the leaf node data of a third set of leaf nodes of the number of leaf nodes and the first event number in the tree data structure of the client using the response datagram, when the response datagram is transmitted from the web server; and regenerating the checksums of the updated third set of leaf nodes.

10. The method of claim 8, wherein the event datagram and the response datagram each include a DatagramSize that identifies an entire size of the corresponding datagram, a DatagramType identifying a type of the corresponding datagram, an EventNum representing whether or not the event datagram is lost, and the data.

11. The method of claim 10, wherein the event datagram and the response datagram are distinguished by the value of the DatagramType.

12. The method of claim 8, wherein the request datagram includes a DatagramSize that identifies an entire size of the datagram, a DatagramType that identifies a type of the datagram, and the checksums of every leaf node of the number of leaf nodes.

13. A method for data synchronization, comprising:

generating a first tree data structure requiring synchronization between a web server and a client in a web-based communication device management system and transmitting the first tree data structure to the client as a second tree data structure when the client initially connects to the web server;

inspecting a change flag of each leaf node of a number of leaf nodes in the first tree data structure periodically to detect whether a change of leaf node data has occurred within any leaf node;

transmitting the leaf node data of every leaf node in the first tree data structure, having a change of leaf node data, in an event datagram at each period to the client;

inspecting whether or not an event is lost by comparing a first event number of the client to a second event number included in the event datagram, when the event datagram is received by the client;

transmitting a request datagram comprising a second checksum for each leaf node of the number of leaf nodes of the second tree data structure to the web server, if the event is lost;

generating a first checksum of each leaf node of the number of leaf nodes in the first tree data structure, and judging whether a change has occurred to the first tree data structure by comparing the corresponding first checksum and second checksum of each leaf node in the first and second tree data structures, respectively, when the request datagram is transmitted to the web server;

transmitting a response datagram comprising both the leaf node data of each of the number of leaf nodes in the first tree data structure having an associated first checksum that differs from the corresponding second checksum and the second event number to the client, if at least one first checksum and its corresponding second checksum differ;

updating the leaf node data of each of the number of leaf nodes in the second tree data structure having an associated first checksum that differs from the corresponding second checksum using the corresponding leaf node data of the first tree data structure in the response datagram; and updating the leaf node data of each of the number of leaf nodes in the second tree data structure having a corresponding first tree data structure leaf node in the event datagram, if the event is not lost.

14. The method of claim 13, wherein the change flag of the corresponding leaf node is set according to a report of changing corresponding management data by a communication device, and is reset by the web server when the management data is communicated to the client.

15. The method according of 13, wherein the second event number is increased by a certain degree whenever the event datagram is transmitted, and the first event number is increased by the certain degree only when the event datagram is received without any loss.

16. The method of claim 13, wherein the client periodically transmits the request datagram.

17. A method for data synchronization, comprising:

for each of a number of communication devices, generating a server leaf node within a server tree data structure comprising management data of the respective communication device and a change flag;

communicating the server tree data structure to a client of a client server system as a client tree data structure, wherein each server leaf node has a corresponding client leaf node within the client tree structure;

setting the change flag of the corresponding server leaf node when the management data of one of the number of communication devices is revised; and resetting the change flag of the corresponding server leaf node when the revised management data is communicated by the server to the client.

18. The method of claim 17, further comprising:

occasionally determining whether the change flag of any of the number server leaf nodes is set; and communicating an event datagram from the server to the client comprising each of the number of server leaf nodes, having a set change flag, and a server event number.

19. The method of claim 18, further comprising:

(a) revising the management data of each client leaf node of the client tree data structure having a corresponding server leaf node within the event datagram, using the management data of the respective server leaf node; and (b) regenerating the checksum of the management data in each of the number of client leaf nodes revised in step (a);

(c) changing a client event number by a predetermined amount;

(d) communicating the client checksum set to the server in a request datagram, wherein, steps (a), (b), and (c) are performed if the server event number contained in the event datagram has a value corresponding to the client event number and step (d) is performed if the server event number contained in the event datagram has a value that does not correspond to the client event number.

20. The method of claim 17, further comprising generating a checksum of the management data in each of the number of client leaf nodes and storing each of the number of checksums as a client checksum set.

21. The method of claim 20, further comprising:

occasionally communicating the client checksum set to the server in a request datagram;

generating a checksum of the management data in each of the number of server leaf nodes; and communicating each of the server leaf nodes, of the number of server leaf nodes, having a respective checksum that differs from the corresponding checksum of the client checksum set, and a server event number to the client in a response datagram.

22. The method of claim 21, further comprising:

(a) revising the management data of each client leaf node of the client tree data structure having a corresponding server leaf node within the response datagram, using the management data of the respective server leaf node; and (b) regenerating the checksum of the management data in each of the number of client leaf nodes revised in step (a).

23. The method of claim 21, wherein the event datagram and response datagram each contain a datagram type and are distinguished by their respective datagram type values.

24. The method of claim 17, further comprising, for each of the number of communication devices, communicating the management data regarding the respective communication device to the server when the management data is revised.

* * * * *